Aug. 5, 1930.         H. R. PORTER         1,772,086
                      CHECK VALVE
                    Filed April 7, 1928

INVENTOR,
Harper R. Porter,
BY
his ATTORNEY.

Patented Aug. 5, 1930

1,772,086

UNITED STATES PATENT OFFICE

HARPER R. PORTER, OF NILES, OHIO, ASSIGNOR TO THE COLUMBUS MACHINE COMPANY, OF COLUMBUS, OHIO, A CORPORATION OF OHIO

CHECK VALVE

Application filed April 7, 1928. Serial No. 268,137.

This invention relates to improvements in swing check valves and has for its objects the provision of a construction which is peculiarly adapted for high pressure and temperature conditions, is sturdy, reliable in operation and yet unusually simple and economical to manufacture. Other advantages of this construction are hereinafter set forth.

In the accompanying drawings forming a part of this specification in which I have illustrated a preferred embodiment of my invention as applied to a swing check valve.

Figure 1:
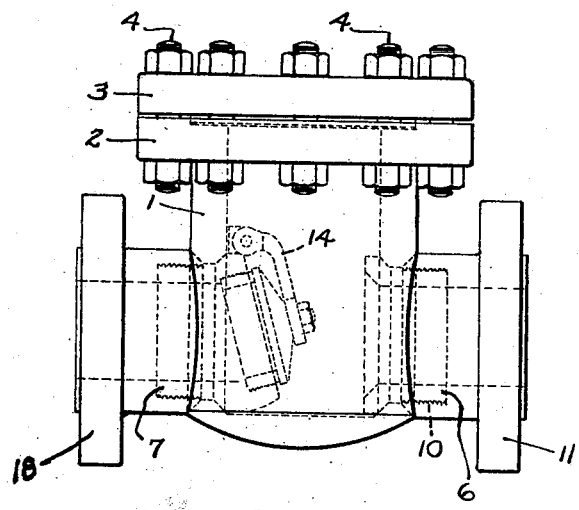
Figure 1 is an elevation of a swing check valve.
Figure 2:
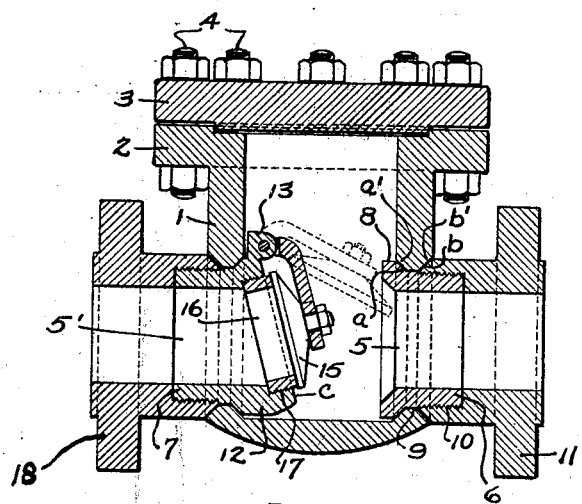
Fig. 2 is a vertical section of the said valve.
Figure 4:
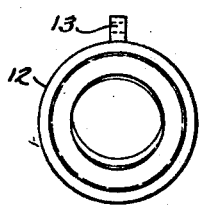
Fig. 4 is an end view of said seat sleeve unit from the left.
Figure 3:
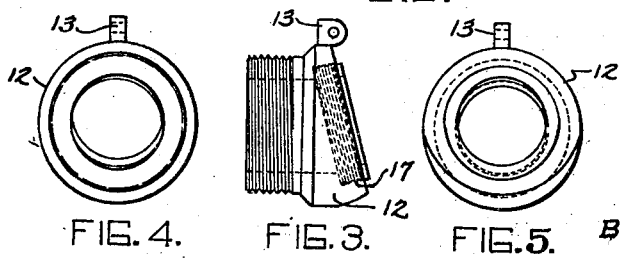
Fig. 3 is an elevation of the seat sleeve unit isolated.
Figure 5:
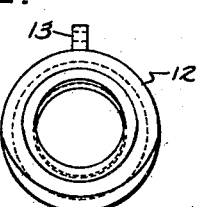
Fig. 5 is an end view of the same unit from the right.

Referring to the drawings and the construction shown therein numeral 1 designates a casing of a check valve body, the same having an upper terminal flange 2 to which is secured a top cap or plate 3 by means of bolts 4.

The lateral walls of said casing are provided with opposing alined apertures 5, 5' which are adapted to receive internal bushing members or sleeves 6 and 7 respectively. The bushing, as shown, has an internal terminal flange 8, the outer face $a$ of which is bevelled so as to snugly fit against the countersunk bevelled face $a'$ formed around the margin of the aperture 5. The annular face or neck 9 of said internal bushing member is of a cross-section substantially corresponding to the cross-section of the inner periphery of the aperture 5 and beyond this annular portion said internal bushing is threaded, as indicated by the reference numeral 10, to receive a hub member 11 that is adapted to be tightly screwed down thereon and which is, in turn, provided with a bevelled end $b$ that is adapted to snugly engage the bevelled face $b'$ of the outer countersunk portion of the casing 1.

The other internal bushing member 7 is similar to the internal bushing member 6, except that in lieu of having a plain flange such as that of the bushing 6, it has a terminal flange 12 which is of considerably greater size than the said flange 8 and has an inclined outer end $c$. Such flange is extended upwardly to form lug 13 to which is pivoted an arm 14 which carries the check valve 15. Said check valve is adapted to be raised and lowered in response to the pressure in the system on a seat ring 16 which is threaded into a recess 17 in the boss or internal flange 12.

A second hub member 18 having a bevelled inner end is screwed on the threaded end of the bushing 7 and said bevelled inner face is of a corresponding bevel and adapted to have fluid-tight engagement with the countersunk bevelled face of said casing when said hub is screwed down into its final position. The flange 12 has a bevelled outer face which is of a corresponding bevel and adapted to have fluid-tight engagement with the bevelled inner face on said casing when the bushing is drawn into its final position by means of the hub member applied thereto.

As is evident from the construction, the valve is assembled by first inserting the internal bushings 6 and 7 the latter carrying the seat ring 16, through the apertures in the side walls of the casing and preferably the check valve 15 is mounted on said bushing 7 prior to the latter being inserted in the casing. The respective hub members are then tightly screwed down on the respective bushings and if desired, the joints between the outer walls of the hub members and the adjacent outer face of the casing can be fillet welded to improve the appearance of the valve body and to strengthen the same. Following the application of the hubs the cover 3 is bolted onto the top of the body and the valve is then ready for testing.

Preferably the casing 1 is formed with solid side walls by extrusion from a solid billet and the side walls are subsequently pierced for the line connections. The internal bushings and the hubs may be extruded, drop-forged or cast as desired.

While I have described a preferred embodiment of my invention, various modifications within the scope of the appended claims can be made without departing from the spirit of the invention.

Having thus described my invention, what I claim and desire to obtain by United States Letters Patent is:

1. In a swing check valve assembly, the combination comprising a casing having a plurality of opposed aligned lateral apertures therethrough, an upper terminal flange integral with said casing, a cover plate bolted thereto, a seat sleeve unit tightly fitted in one of said apertures and projecting both inside and outside of the said body, an enlarged boss on the inside of said seat sleeve unit, the inner face of said boss being inclined with respect to the plane of said aperture in which said seat sleeve is mounted, a swing check valve pivotally secured to the inner end of said seat sleeve unit and adapted to seat thereon and thereby close communication therethru, a hub member threaded onto the outer end of said seat sleeve unit and in fluid-tight engagement with the wall of said casing and an internal bushing member fitted in the other of said apertures, said bushing extending both inside and outside of the wall of said casing adjacent said aperture, an inner internal flange on said bushing and a second hub member threated on the outer end of said bushing and having fluid-tight engagement with the wall of said casing adjacent said aperture.

2. The sub-combination comprising a seat sleeve unit having an enlarged boss on its inner end, said boss having an inclined end face and a lug at the top of the inner end of said seat sleeve unit adapted to admit of a check valve being secured thereto, and the outer end of said seat sleeve unit having a threaded portion adapted to receive a hub unit and the face of said boss nearest to said threaded portion being bevelled peripherally thereof.

3. The sub-combination comprising a seat sleeve unit having an enlarged boss on its inner end, said boss having an inclined end face having a recess adapted to receive a valve seat, a seat ring in threaded engagement with said recess, the plane of said seat ring being parallel to said inclined face, and a lug at the top of the inner end of said seat sleeve unit adapted to admit of a check valve being secured thereto, and the outer end of said seat sleeve unit having a threaded portion adapted to receive a hub unit and the face of said boss nearest to said threaded portion being bevelled peripherally thereof.

4. A swing check valve assembly, comprising a casing having a central valve chamber and opposed alined lateral apertures extending through said casing, internal bushings fitted in said apertures, one of them having an inclined inner end, a seat ring on said inner end of said latter bushing, means for securing a swing check valve to the inner end of said latter bushing and a swing check valve pivotally secured thereto and adapted to seal communication through said seat ring when seated thereon, and hub members threaded onto the outer ends of the respective bushings and having fluid-tight engagement with said bushings and said casing.

Signed at Niles, in the county of Trumbull and State of Ohio, this 8th day of March, 1928.

HARPER R. PORTER.